US006929310B2

(12) United States Patent
Okada

(10) Patent No.: US 6,929,310 B2
(45) Date of Patent: Aug. 16, 2005

(54) DRIVE SYSTEM OF POWERED DOORS OR GATES FOR VEHICLES

(75) Inventor: Hiroshi Okada, Tokyo (JP)

(73) Assignee: Ohi Seisakusho Co., Ltd., Kanagawa (JP)

( * ) Notice: Subject to any disclaimer, the term of this patent is extended or adjusted under 35 U.S.C. 154(b) by 0 days.

(21) Appl. No.: 10/618,497

(22) Filed: Jul. 11, 2003

(65) Prior Publication Data

US 2004/0010974 A1 Jan. 22, 2004

(30) Foreign Application Priority Data

Jul. 11, 2002 (JP) ..................................... P2002-202763

(51) Int. Cl.$^7$ ........................... B60J 5/10; B62D 33/027

(52) U.S. Cl. ......................... 296/146.8; 296/56; 49/341

(58) Field of Search ........................... 296/146.8, 146.4, 296/56; 49/339–344

(56) References Cited

U.S. PATENT DOCUMENTS 6,080,469 A * 6/2000 Ozeki et al. ................ 428/213
6,092,337 A * 7/2000 Johnson et al. ............... 49/340
6,142,551 A * 11/2000 Ciavaglia et al. ............. 296/56
6,283,535 B1 * 9/2001 Yuge ....................... 296/146.8
6,382,706 B2 * 5/2002 Yuge et al. .............. 296/146.4
6,401,392 B1 * 6/2002 Yuge ........................... 49/340
6,425,205 B2 * 7/2002 Wygle et al. ................. 49/349
6,513,859 B2 * 2/2003 Yuge ....................... 296/146.4
2003/0145524 A1 * 8/2003 Ihashi ......................... 49/342

FOREIGN PATENT DOCUMENTS

DE 198 46 764 A1 4/1999
EP 1 154 113 A2 11/2001
JP 2001-253241 9/2001

* cited by examiner

*Primary Examiner*—D. Glenn Dayoan
*Assistant Examiner*—Greg Blankenship
(74) *Attorney, Agent, or Firm*—Brenda O. Holmes; Kilpatrick Stockton LLP

(57) ABSTRACT

A drive system for a hinged gate of a vehicle, which includes: a motor unit, a rack and pinion mechanism, a link member connected to a point of the hinged gate, and a shaft member fixed to the rack, to which the link member is rotatably connected. The motor unit includes a motor, gears, and a casing accomodating the gears. The rack and pinion mechanism includes a pinion driven by the motor unit and the rack movably supported on the casing of the motor unit. The casing has a guide casing, which extends in a longitudinal direction of the rack. The guide casing is formed to have a closed section surrounding the shaft member and is provided therein with a guide member configured for guiding the rack.

6 Claims, 6 Drawing Sheets

DRIVE SYSTEM OF POWERED DOORS OR GATES FOR VEHICLES

BACKGROUND OF THE INVENTION

1. Field of the Invention

The present invention relates to a drive system of powered doors or gates for vehicles, more particularly to a drive system of a vertically openable rear gate pivotally attached to a vehicle body, which includes: a rack and pinion mechanism, a motor for driving the pinion, and a link member connected to the rack and the rear gate, etc.

2. Description of the Related Art

Japanese Patent Application Laid-Open No. 2001-253241 discloses a rear gate drive system which includes: a channel track provided along a vehicle rear pillar, a rack and pinion mechanism in which the rack is provided inside the track as slidable in the longitudinal direction thereof, and a link member connected to the rack and the rear gate. The rack is formed to have, on its upper end, a joint portion to which the link member is connected by a ball joint. The rear gate is opened/closed, as the rack is driven to move in the track by rotation of the pinion.

However, in the above drive system, the channel track is provided with a longitudinally extending slot, which the joint portion of the rack is protruded through and is guided by, as the rack moves in the track. Load on the joint portion, when the rear gate is opened/closed, is therefore transferred to the periphery of the slot, whereby, after repeated uses, the channel track is deformed into having an expanded slot which results in excess play impeding the smooth motion of the rear gate in a opening/closing operation.

SUMMARY OF THE INVENTION

In consideration of the problem as described above, the object of the present invention is to provide a rigid drive system of powered doors or gates for vehicles with controlled play in its movable components to thereby achieve the long-lasting smooth motion of the doors or gates.

An aspect of the present invention is a drive system for a hinged gate of a vehicle, comprising: a motor unit including a motor, gears for reducing speed of the motor, and a casing for accomodating the gears; a rack and pinion mechanism including a pinion driven by the motor unit and a rack movably supported on the casing of the motor unit; a link member connected to a point of the hinged gate of the vehicle; and a shaft member fixed to the rack, to which the link member is rotatably connected, wherein the casing is provided with a guide casing extending in a longitudinal direction of the rack, and wherein the guide casing is formed to have a closed section surrounding the shaft member and is provided therein with a guide member configured for guiding the rack.

BRIEF DESCRIPTION OF THE DRAWINGS

The invention will now be described with reference to the accompanying drawings, wherein.

DETAILED DESCRIPTION OF THE PREFERRED EMBODIMENTS

An embodiment of the present invention will be explained below with reference to the drawings. Note that, in FIGS. 1 through 3, left and right sides of the drawings correspond to the “front” and “rear” of a vehicle, respectively.

Figure 1:
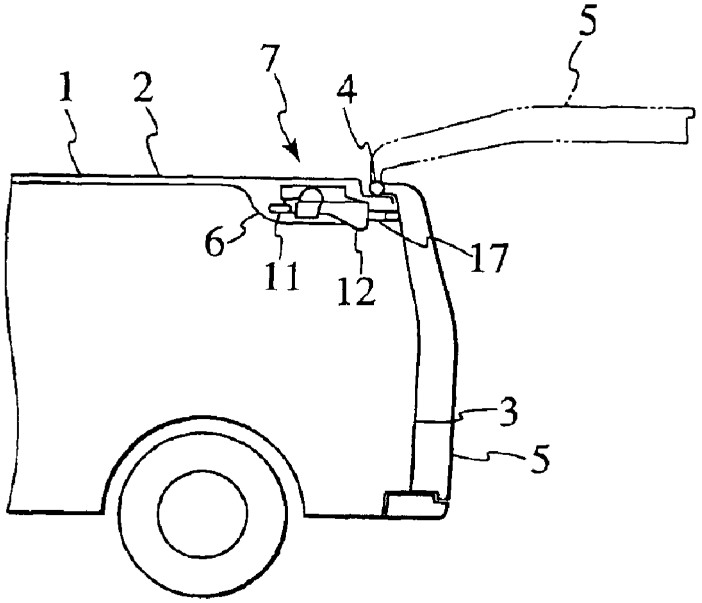
FIG. 1 shows an arrangement of a drive system according to an embodiment of the present invention, where the drive system is provided on an upper side of a rear vehicle body.

As shown in FIG. 1, a vehicle body 1 is provided, at its rear end, with an opening 3 which is defined by trailing edges of a roof panel 2 and rear pillars (not shown) on both sides in a vehicle transverse direction, and a vertically pivoting rear gate 5 attached to the rear end of the roof panel 2, permitting access to the rear compartment of the vehicle through the opening 3.

The rear gate 5 is attached to the vehicle body 1 by a hinge 4 provided along the upper edge of the gate 5. The hinge 4 permits the rear gate 5 to pivotably swing between a lower closed position, as indicated by a solid line in FIG. 1, and a raised upper position, as indicated by a chain double-dashed line in FIG. 1.

To drive the opening/closing of the rear gate 5, as well as to hold the rear gate 5 open in its raised position, a driving unit 7 is provided. The driving unit 7 is located between a lower surface of the roof panel 2 and a roof trim 6 extended under the roof panel 2 as a ceiling of the rear compartment.

The driving unit 7 includes: a drive motor 8 rotatable in both forward and backward directions, which is controlled by operating a control switch (not shown) provided in the vicinity of a driver’s seat, on a remote controller, on the rear gate 5 or the like; a casing 9 which accommodates reduction gears each rotatably supported therein to reduce rotation speed of the motor 8, the reduction gears include an output gear 10 as the lowest speed gear for outputting the rotation of the motor 8; a rack 11 meshed with the output gear 10, configured as movable in a longitudinal direction thereof (frontward/rearward); and a tubular guide casing 12 fixed to a lateral side of the casing 9, and extended in the longitudinal direction of the rack 11.

Figure 5:
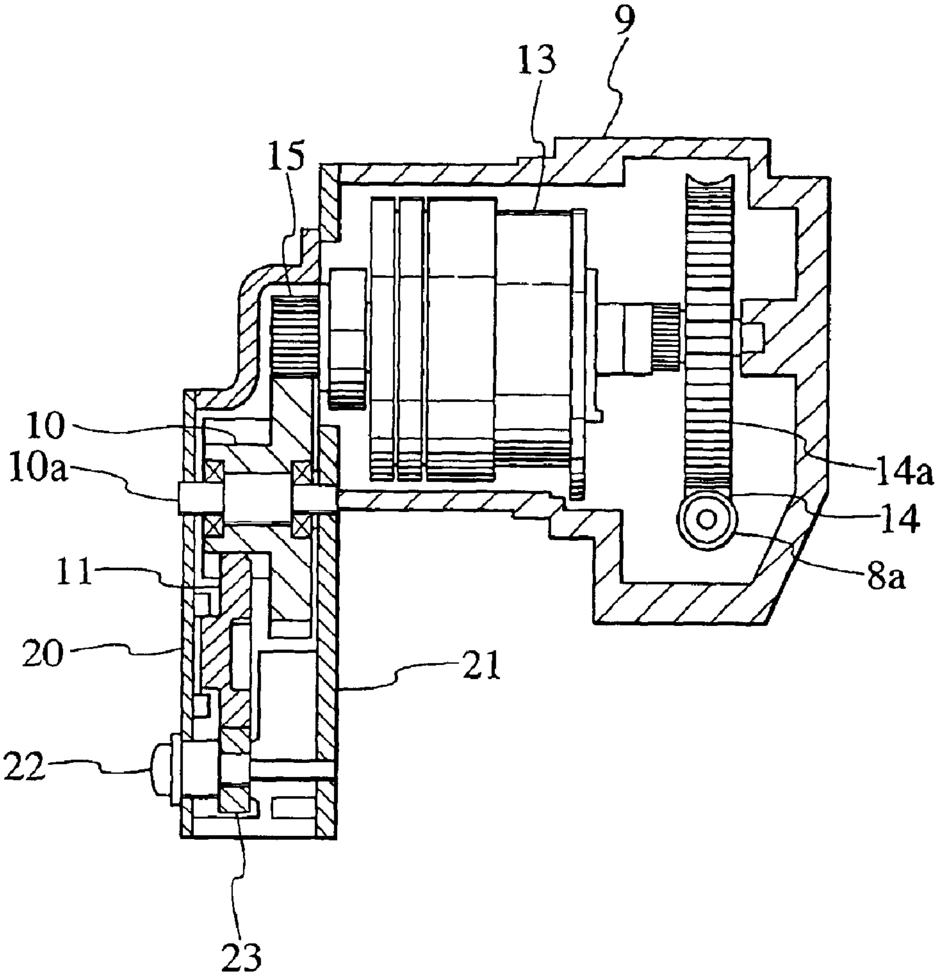
FIG. 5 is a longitudinal sectional view taken along the line V—V of the drive system of FIG. 2.

As shown in FIG. 5, the reduction gears in the casing 9 include: a worm gear mechanism 14 which is constituted of a worm **8*a* fixed to a longitudinally extending output shaft of the motor 8, and a worm wheel 14*a* meshed with the worm 8*a* and supported by the casing 9 to be rotatable about a transversely extending horizontal axis; a pinion 15 arranged coaxially with the worm wheel 14*a*; and the output gear 10 meshed with the pinion 15 and rotatably supported below the pinion 15 by a shaft 10*a* extended in parallel with a rotational axis of the pinion 15**.

Between the worm gear mechanism 14 and the pinion 15, an electromagnetic friction clutch 13 is disposed to connect/disconnect a torque/rotation transmission path from the output shaft of the motor 8 to the output gear 10.

The transmission path is connected to transmit the torque/rotation of the motor 8 to the rack 11, as the clutch 13 is excited by operation of the control switch and engaged. The transmission path is disconnected to stop transmission of the torque/rotation of the motor 8 to the rack 11, as the clutch 13 ceases to be excited and disengages.

If the control switch is operated to open the rear gate 5 while the rear gate 5 is in a closed position, the motor 8 starts its forward rotation, and the clutch 13 is excited and engages. The torque/rotation of the motor 8 is thus transmitted through the connected transmission path; the worm gear mechanism 14, the clutch 13, the pinion 15 to the output gear 10, and converted into a linear movement of the rack 11, in which the rack 11 is moved rearward from its closed position indicated by a solid line in FIG. 2 to its open position indicated by a chain double-dashed line. As the rack 11 is moved rearward, the rear gate 5 is swung and pushed up from its closed position to a raised position by a connection link 17 which is connected, at its front end, to the rear end of the rack 11, and at its rear end, to a point on the upper side frame of the rear gate 5.

If the control switch is operated to close the rear gate 5 while the rear gate 5 is in its open position, the motor 8 starts its backward rotation, and the clutch 13 is excited and engages. Similarly, the torque/rotation of the motor 8 is transmitted and converted into the linear movement of the rack 11. The rack 11 is moved forward from the closed position to the open position. The connection link 17 pulls down the rear gate 5 from the open position to the closed position.

As shown in FIG. 5, on a lower part of the lateral side of the casing 9, in the vicinity of a point where the rack 11 and the output gear 10 engage with each other, guide brackets 20 and 21 are provided, which support the rack 11 as slidable in the longitudinal direction of the rack 11 therebetween. The inner side faces of the guide brackets 20 and 21 are configured to be brought into sliding contact with respective left and right sides of the rack 11, with minimal gaps provided therebetween to prevent excess play of the rack 11 in a direction crossing the longitudinal direction of the rack 11.

Under the rack 11, directly below the output gear 10, a roller 23 is provided, which is rotatably supported on a shaft 22 extending transversely between the guide brackets 20 and 21. The roller 23 maintains rolling contact with a lower side of the rack 11, and cooperating with the output gear 10, suppresses up-and-down movement of the rack 11 at the point of engagement between the rack 11 and the output gear 10, to thereby maintain a secure engagement therebetween.

Figure 6:
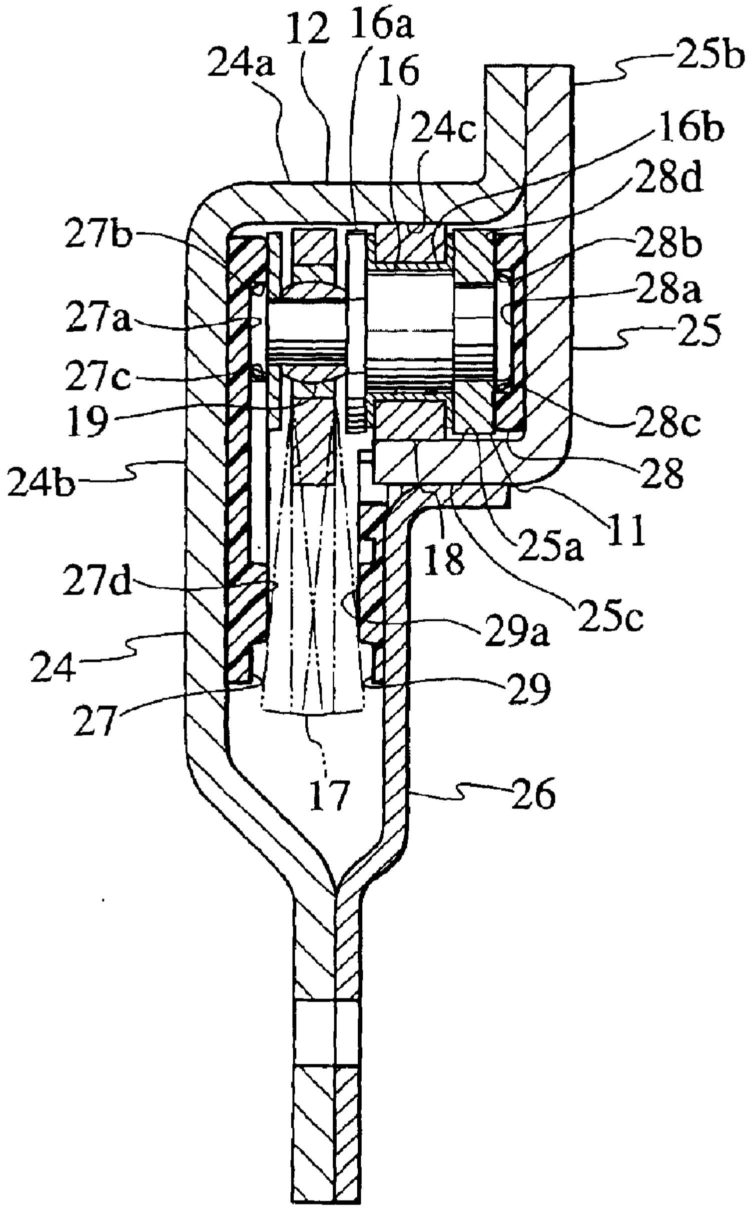
FIG. 6 is a longitudinal sectional view taken along the line VI—VI of the drive system of FIG. 2.

As shown in FIG. 6, the rack 11 has on the rear end thereof a staged shaft (connection shaft) 16 extending in a direction perpendicular to the longitudinal direction of the rack 11, leftward in the drawing.

The shaft 16 is malleable and riveted at its right end to the rear end of the rack 11 being pressed to form a button-head. The shaft 16 is formed to have, on its mid portion, a flange **16*a* and, between the flange 16*a* and the rack 11, a large-diameter portion 16*b* onto which a roller 18 is rotatably fitted. The roller 18 rolls on a later-described track 25*a* provided on an inner side of the guide casing 12**.

On the left side of the flange **16*a* opposite to the large-diameter portion 16*b*, the shaft 16 has a small-diameter portion to which a front end of the connection link 17 is rotatably connected at a joint 19. The left end of the shaft 16 is pressed to form a button-head similar to the right end thereof and fasten the joint 19 to the small-diameter portion thereof. The joint 19 includes a bearing, such as a spherical bearing, which permits the rotation of the connection link 17 in every direction relative to the shaft 16. The connection link 17 is thus permitted to swing leftward or rightward, or rotate about an axis passing through the later-described two connection points, relative to the shaft 16 and the rack 11. A rear end of the connection link 17 is rotatably connected to the upper side frame of the rear gate 5 at a joint (not shown) which permits the rotation of the connection link 17 in every direction relative to the rear gate 5**.

Figure 2:
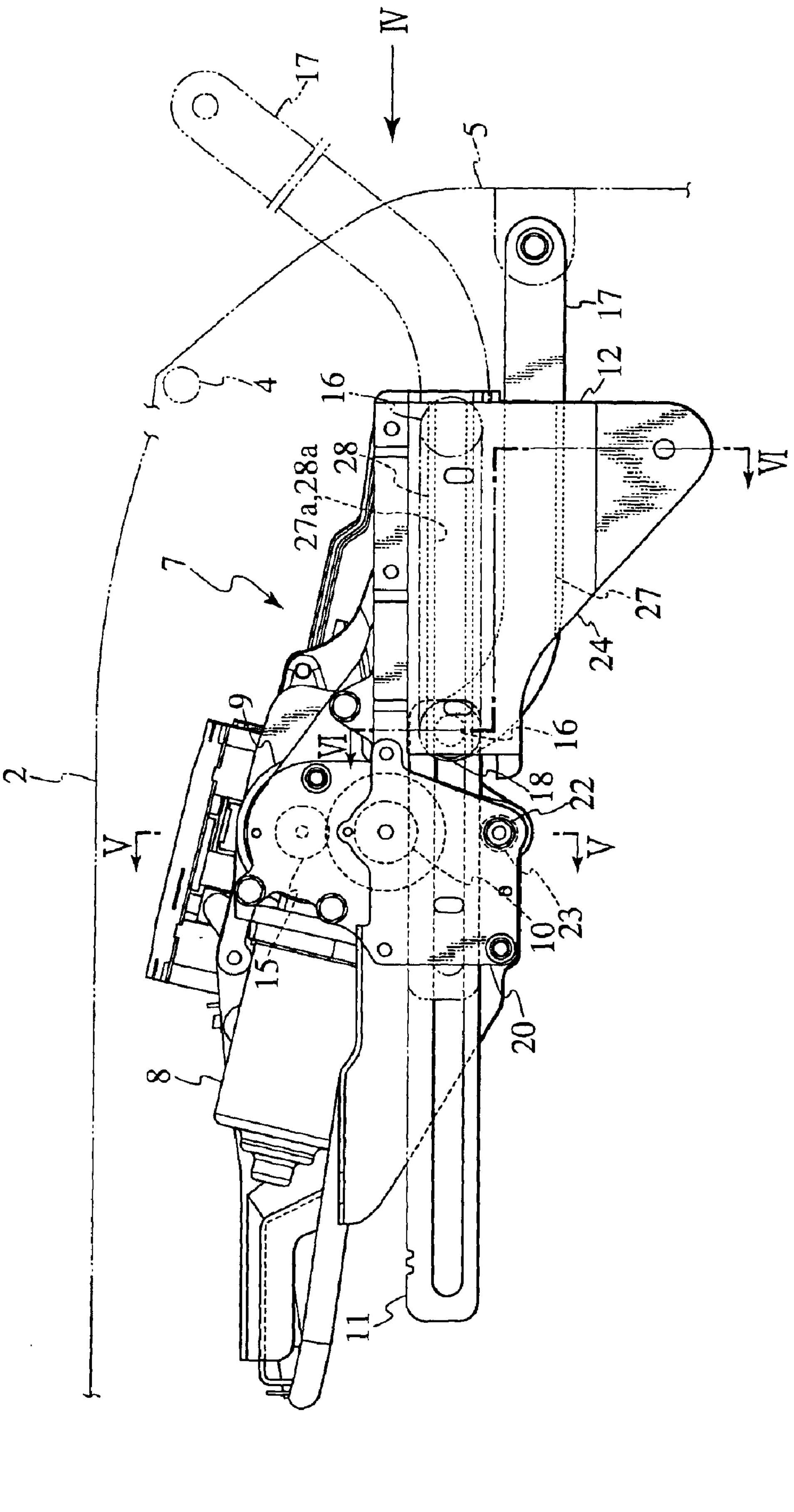
FIG. 2 is a side view of the drive system of FIG. 1.
Figure 3:
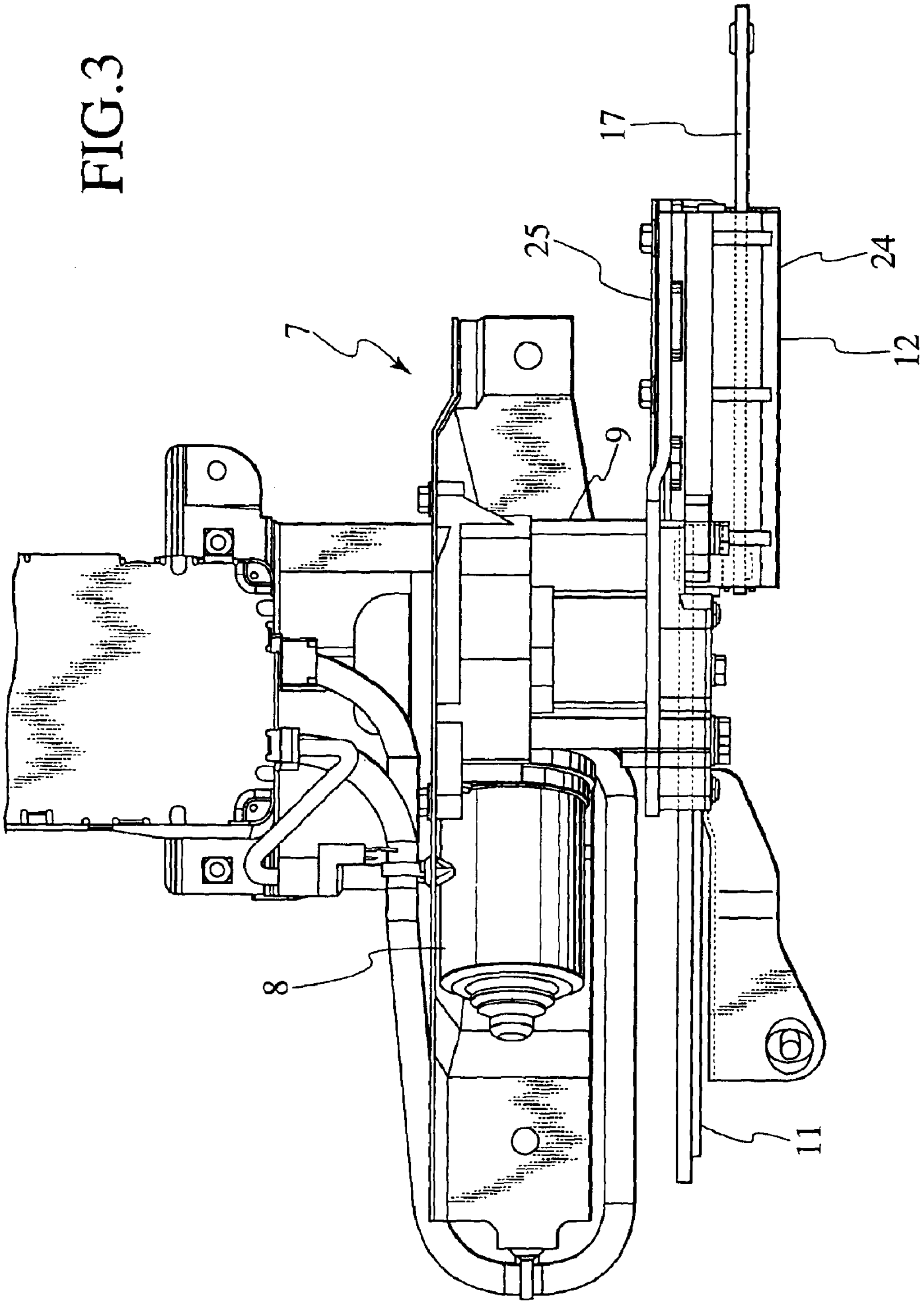
FIG. 3 is a plan view of the drive system of FIG. 1.
Figure 4:
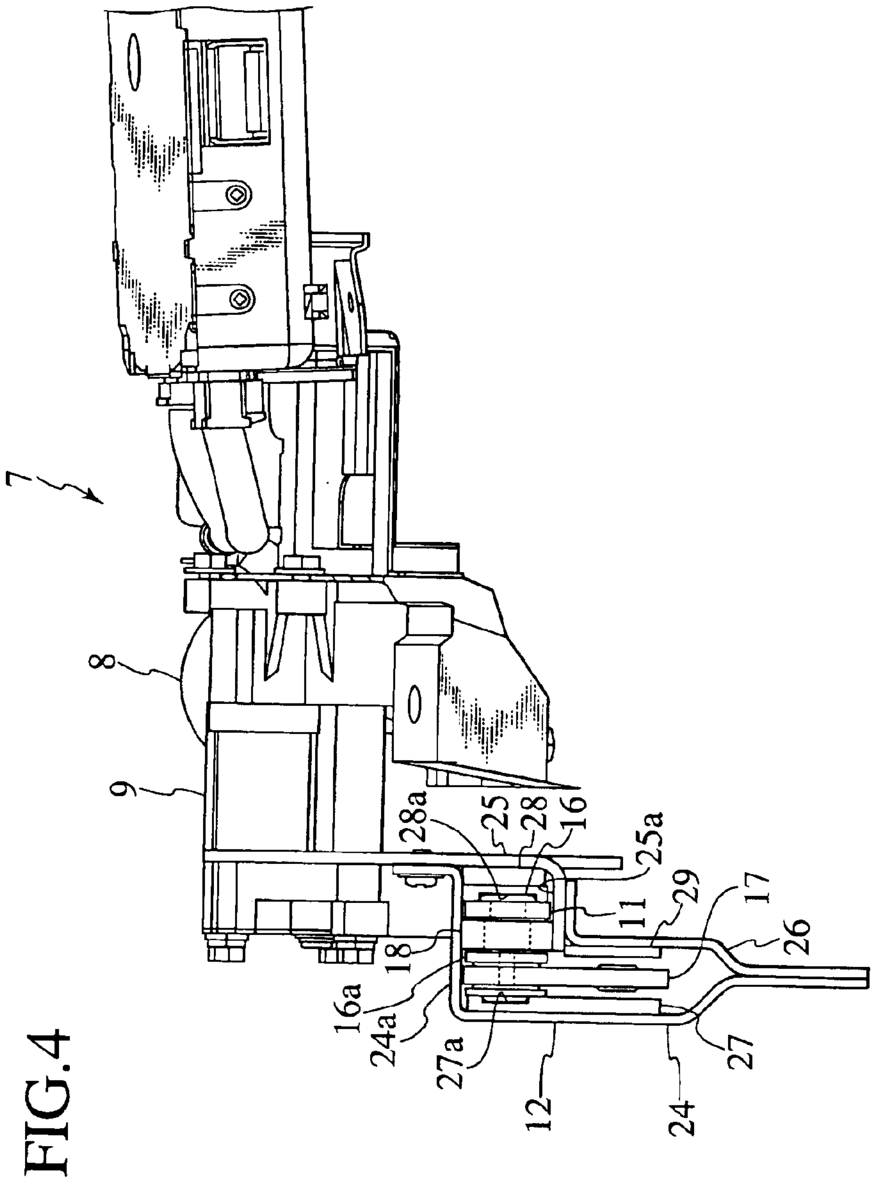
FIG. 4 shows the drive system of FIG. 1 as viewed in the direction of arrow IV of FIG. 2.

As the rear gate 5 is swung open, accompanying the linear rearward movement of the rack 11 from the closed position to the open position, the connection link 17 is rotated upward about the shaft 16 and moved rearward from its closed position indicated by the solid line in FIG. 2 to its open position indicated by the chain double-dashed line.

The driving unit 7 is usually arranged so that a connection point between the front end of the connection link 17 and the rear end of the rack 11, that is substantially the joint 19, and a connection point between the rear end of the connection link 17 and the upper side frame of the rear gate 5 are located in transversely different positions, because of design requirements associated with vehicle equipment layout. As the rear gate 5 is swung open or swung closed, the latter connection point moves up and down while the former connection point moves substantially horizontally. Change in the level difference between the connection points in transversely different positions results in the swing movement of the connection link 17 in the vehicle transverse direction relative to the driving unit 7 as indicated by the imaginary lines shown in FIG. 6.

This swing movement is permitted by the joints with the rack 11 and the rear gate 5 at both ends of the connection link 17. These joints absorb even positional errors at assembly, and deformation or the like of the rear gate 5, the driving unit 7 or the like.

The casing 9 has the guide casing 12 fixed thereto on the rear side of the guide brackets 20 and 21. As shown in FIG. 6, the guide casing 12 is constituted of a transversely outer guide casing 24 and inner guide casings 25 and 26, and formed in a tubular shape extended in a direction substantially parallel to the longitudinal direction of the rack 11. The rear end of the rack 11, the front end of the connection link 17, and the shaft 16 and joint 19 therebetween are all accommodated within the tubular guide casing 12 and slidably guided in the longitudinal direction of the rack 11. The upper inner guide casing 25 is fixed by welding or fastened with bolts, on its upper side, to the upper part of the outer guide casing 24, and on its lower side, to the lower inner guide casing 26. The lower inner guide casing 26 is fixed by welding or fastened with bolts, on its lower side, to the lower part of the outer guide casing 24, and on its upper side, to the lower part of the upper inner guide casing 25.

The guide casing 12 may be formed integrally, instead of putting the separate guide casings 24, 25 and 26 together by welding or bolts, as long as the guide casing 12 has a rigid structure of tubular closed sectional shape which can guide the rack 11 including the shaft 16 and the connection link 17 back and forth.

The outer guide casing 24 is provided, on a surface thereof opposing the inner guide casings 25 and 26, with a longitudinally extending outer guide member 27 adhered thereto. The outer guide member 27 is made of a synthetic resin and formed to have on its inner surface a longitudinally extending guide groove **27*a*** as guiding means, which has a shape concave in section.

The upper inner guide casing 25 is provided, on a surface thereof opposing the outer guide casing 24, with a longitudinally extending upper inner guide member 28 adhered thereto. The upper inner guide member 28 is made of a synthetic resin and formed to have on its inner surface a longitudinally extending guide groove **28*a*** as guiding means, which has a shape concave in section.

When the rack 11 moves in its longitudinal direction during the opening/closing of the rear gate 5, the left end of the shaft 16 slides inside the guide groove **27*a*, being guided between the upper and lower walls 27_b_ and 27_c_ of the guide groove 27_a_, and the right end of the shaft 16 slides inside the guide groove 28_a_, being guided between the upper and lower walls 28_b_ and 28_c_ of the guide groove 28**_a_.

Since the shaft 16 travels back and forth with both left and right ends thereof being guided in the guide grooves 27_a_ and 28_a_, up-and-down and left-and-right movements of the shaft 16 are suppressed during traveling back and forth. Thus, the rear end of the rack 11 including the shaft 16 and the front end of the connection link 17 can move smoothly back and forth in the guide casing 12, being guided by the guide members 27 and 28. Further, during the linear movement of the rack 11, the upper inner guide member 28 is kept in sliding contact with the side face of rack 11 at its slide faces 28_d_ which are provided on the inner side of the upper inner guide member 28, above and below the guide groove 28_a_. This also contributes to the smooth movement of the rack 11 with minimal up-and-down and left-and-right movement of the shaft 16, reducing noise generated by the movement of the shaft 16.

The outer guide member 27 is formed to have on its lower part a projection 27_d_ protruding rightward. And, on a face of the lower inner guide casing 26 opposing the outer guide casing 24, there is provided a lower inner guide member 29 adhered thereto. The lower inner guide member 29 is made of synthetic resin and formed to have, on its inner face at a level corresponding to the projection 27_d_, a projection 29_a_ protruding leftward. As described above, the connection link 17 is rotated about the shaft 16, and is swung leftward and rightward or rotated about the axis passing through the two connection points, as indicated by the chain double-dashed line in FIG. 6, when the rear gate 5 is opened/closed. When the connection link 17 swings leftward, the lower left side face of the connection link 17 is brought into contact with the projection 27_d_ of the outer guide member 27. When the connection link 17 swings rightward, the lower right side face of the connection link 17 is brought into contact with the projection 29_a_ of the lower inner guide member 29. The provision of the projections 27_d_ and 29_a_ prevents noise generation in the swinging of the connection link 17.

Instead of providing the projections 27_d_ and 29_a_ on the guide casings 24 and 26, cushioning pieces of elastic material may be provided on the connection link 17 at the respective side faces thereof opposing the outer guide casing 24 and the lower inner guide casing 26, so that the cushioning pieces can be brought into sliding contact with the inner side faces of the guide casings 24 and 26 as the connection link 17 is swung. Noise generation in the swinging of the connection link 17 can be similarly prevented.

The upper inner guide casing 25 is formed by bending to have a substantially L-shape section with a vertical wall 25_b_, the inner side face of which the upper inner guide member 28 is adhered to, and a horizontal wall 25_c_ extending leftward from the lower end of the vertical wall 25_b_. The horizontal wall 25_c_ has on its top surface of the track 25_a_ on which the roller 18 of the shaft 16 rolls when moving back and forth in the guide casing 12. The outer guide casing 24 is formed to have a vertical wall 24_b_, the inner side face of which the outer guide member 27 is adhered to, and a horizontal wall 24_a_ extending rightward from the upper end of the vertical wall 24_b_. The horizontal wall 24_a_ is positioned above the horizontal wall 25_c_ of the upper inner guide casing 25 so as to place a lower face 24_c_ thereof parallel to the track 25_a_. Cooperating with the track 25_a_ of the upper inner guide casing 25, the lower face 24_c_ of the horizontal wall 24_a_ of the outer guide casing 24 defines a guide path for the roller 18 along which the roller 18 is guided to move back and forth. In the guided path, there is provided a minimal gap between the top of the roller 18 and the lower face 24_c_ of the horizontal wall 24_a_ to prevent excess float of the roller 18. Thus, the rack 11 including the shaft 16 can move more smoothly during the travel along the guide path.

According to the embodiment of the present invention, the drive system of powered doors or gates for vehicles includes: a motor unit including the motor 8, the gears 8_a_, 14_a_ and 15 for reducing speed of the motor 8, and the casing 9 for accomodating the gears 8_a_, 14_a_ and 15; a rack and pinion mechanism including the output gear 10 driven by the motor unit and the rack 11 movably supported on the casing 9 of the motor unit; the connection link 17 connected to a point of the gate of the vehicle; and the shaft 16 fixed to the rack 11, to which the connection link 17 is rotatably connected, in which the casing 9 is provided with the guide casing 12 extending in the longitudinal direction of the rack 11, and the guide casing 12 is formed to have a closed section surrounding the shaft 16 and is provided therein with the guide members 27 and 28 configured for guiding the rack 11.

According to the drive system structured as described above, the rack 11 is guided by the guide members 27 and 28 provided inside the guide casing 12 having a rigid structure of the closed section surrounding the shaft 16, when moving in the longitudinal direction thereof. The up-and down or left-and-right movement of the rack 11 is suppressed during its travel, thus providing the smooth movement of the rack 11.

Further, the guide members 27 and 28 are fixed on the inner surface of the guide casing 12 and each of the guide members 27 and 28 is provided with the guide groove 27_a_ or 28_a_ into which one of the ends of the shaft 16 is slidably fitted.

Thus, the up-and down or left-and-right movement of the shaft 16 is also suppressed by the simple guide grooves 27_a_ and 28_a_, thus making the movement of the rack 11 smoother.

And further, the shaft 16 is provided with the roller 18 rotatably supported thereon and the guide casing 12 is formed to have the track 25_a_ for the roller 18. This structure provides even smoother movement of the rack 11 inside the casing 12.

And further, the guide member 27 and 28 are made of a synthetic resin and are configured to be in sliding contact with the respective side faces of the rack 11. The up-and down or left-and-right movement of the rack 11 and the connection shaft 16 can be further suppressed.

And further, the shaft 16 is provided with the joint 19 by which the connection link 17 is connected, and the joint 19 allows the connection link 17 to rotate about the axis crossing the center axis of the shaft member. And the guide casing 12 is provided therein with cushion members (the protrusions 27_d_ and 29_a_) for receiving the connection link 17 rotated about the axis crossing the shaft 16. Thus, it is possible to prevent the generation of noise as well as to limit the swing movement of the connection link 17 within a proper range.

The preferred embodiment described herein is illustrative and not restrictive, and the invention may be practiced or embodied in other ways without departing from the spirit or essential character thereof. The scope of the invention being indicated by the claims, and all variations which come within the meaning of claims are intended to be embraced herein.

The present disclosure relates to subject matter contained in Japanese Patent Application No. 2002-202763, filed on Jul. 11, 2002, the disclosure of which is expressly incorporated herein by reference in its entirety.

What is claimed is:

1. A drive system for a hinged gate of a vehicle, comprising:

a motor unit including a motor, gears for reducing speed of the motor, and a casing for accomodating the gears;

a rack and pinion mechanism including a pinion driven by the motor unit and a rack movably supported on the casing of the motor unit;

a link member connected to a point of the hinged gate of the vehicle; and a shaft member fixed to the rack, to which the link member is rotatably connected, wherein the casing is provided with a guide casing extending in a longitudinal direction of the rack, and wherein the guide casing is formed to have a closed section surrounding the shaft member and is provided therein with a guide member configured for guiding the rack.

2. The drive system according to claim 1, wherein the guide member is fixed on an inner surface of the guide casing and is provided with a guide groove into which an end portion of the shaft member is slidably fitted.

3. The drive system according to claim 1, wherein the shaft member is provided with a roller rotatably supported thereon and the guide casing is formed to have a track for the roller.

4. The drive system according to claim 2, wherein the guide member is made of a synthetic resin and is configured to be in sliding contact with a side face of the rack.

5. The drive system according to claim 1, wherein the shaft member is provided with a joint member by which the link member is connected, and the joint member allows the link member to rotate about an axis that crosses the shaft member.

6. The drive system according to claim 5, wherein the guide casing is provided therein with a cushion member for receiving the link member rotated about the axis that crosses the shaft member.

* * * * *